United States Patent
Bala

(10) Patent No.: US 7,652,808 B2
(45) Date of Patent: Jan. 26, 2010

(54) SPATIALLY VARYING LUMINANCE COMPRESSION GAMUT MAPPING SYSTEM AND METHOD

(75) Inventor: Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 845 days.

(21) Appl. No.: 10/733,608

(22) Filed: Dec. 11, 2003

(65) Prior Publication Data

US 2005/0128496 A1 Jun. 16, 2005

(51) Int. Cl.
*G03F 3/00* (2006.01)
*G06K 1/00* (2006.01)
*G06K 9/00* (2006.01)
*G06K 9/36* (2006.01)

(52) U.S. Cl. ............ 358/520; 358/1.9; 358/518; 382/167; 382/261

(58) Field of Classification Search ............ 358/1.9, 358/518, 519, 520, 521, 522, 523, 3.24, 515, 358/517, 525, 537; 382/162, 167, 254, 260, 382/261, 264, 266, 269, 274, 275; 345/590, 345/591, 589; 386/44; 348/222.1, 235, 663, 348/668
See application file for complete search history.

(56) References Cited

U.S. PATENT DOCUMENTS

| | | | | |
|---|---|---|---|---|
| 5,012,333 A * | 4/1991 | Lee et al. | | 358/520 |
| 5,450,216 A * | 9/1995 | Kasson | | 358/518 |
| 6,275,605 B1 * | 8/2001 | Gallagher et al. | | 382/162 |
| 6,317,521 B1 * | 11/2001 | Gallagher et al. | | 382/260 |
| 6,342,951 B1 * | 1/2002 | Eschbach et al. | | 358/1.9 |
| 6,646,762 B1 | 11/2003 | Balasubramanian et al. | . | 358/1.9 |
| 6,868,179 B2 * | 3/2005 | Gruzdev et al. | | 382/167 |
| 2002/0008784 A1 * | 1/2002 | Shirata et al. | | 348/673 |
| 2002/0186387 A1 * | 12/2002 | Moroney et al. | | 358/1.9 |

OTHER PUBLICATIONS

K.M. Braun, R. Balasubramanian, R. Eschbach, "Development and Evaluation of Six Gamut-Mapping Algorithms for Pictorial Images", *Proc. IS&T/SID's 7th Color Imaging Conference*, 1999, pp. 144-148.
G.J. Braun, M.D. Fairchild, "General-Purpose Gamut-Mapping Algorithms: Evaluation of Contrast-Preserving Rescaling Functions for Color Gamut Mapping", *Proc. IS&T/SID's 7th Color Imaging Conference*, 1999, pp. 167-172.
N. Moroney, "Local Color Correction Using Non-Linear Masking", *Proc. IS&T/SID's 8th Color Imaging Conference*, 2000, pp. 108-111.

* cited by examiner

*Primary Examiner*—King Y Poon
*Assistant Examiner*—Peter L Cheng
(74) *Attorney, Agent, or Firm*—Oliff & Berridge, PLC

(57) ABSTRACT

A system and method for gamut mapping includes a luminance compression algorithm for gamut mapping that varies across different parts of the image. In shadow regions, a soft compression function is applied to bring out the detail. In other regions, including areas with high local contrast, a hard clipping function is applied to preserve local contrast. The algorithm adaptively blends between these two functions to ensure that the overall compression function is spatially smooth. The system and method may also use chrominance information to compute "perceived lightness", to be used as input to the low-pass filter. Also, the blending function α( ) could be a function of chrominance as well as luminance.

14 Claims, 3 Drawing Sheets

SPATIALLY VARYING LUMINANCE COMPRESSION GAMUT MAPPING SYSTEM AND METHOD

CROSS-REFERENCE TO RELATED APPLICATIONS

This invention is related to U.S. Pat. No. 6,646,762 to T. Balasubramanian, et al. for "Gamut Mapping Preserving Local Luminance Differences", the contents of which are incorporated herein by reference.

FIELD OF THE INVENTION

This invention relates generally to gamut mapping systems and methods, and more particularly, to a gamut mapping system and method in which luminance compression varies across different parts of the image.

BACKGROUND OF THE INVENTION

Color printing devices and display devices are inherently limited to a range of reproducible colors, sometimes referred to as the color gamut. Because such image reproduction devices are non-ideal, they cannot reproduce every possible color that can be seen by a human. Gamut mapping is often required because the color range that is possible to reproduce with one device is commonly not identical with the color range possible to reproduce with another device. Thus, while displays and printers have a large number of colors that are reproducible by both types of devices, there may be certain combinations of sets of color values that are outside the reproduction capability of one or the other.

Gamut mapping is a well-known problem to be dealt with in color management systems. Input image colors must be mapped to the gamut of the output device in a way that preserves the intent and appearance of the image. An important component of gamut mapping is compression of the luminance dynamic range of the image to that of the output device. Standard approaches apply compression algorithms that are independent of image content (see, for example, K. M. Braun, R. Balasubramanian, R. Eschbach, "Development and Evaluation of Six Gamut-Mapping Algorithms for Pictorial Images", *Proc. IS&T/SID's 7th Color Imaging Conference*, pp. 144-148, 1999). These approaches can result in undesirable trade-offs between contrast and detail in the shadows and highlights. Some recent algorithms (see, for example, G. J. Braun, M. D. Fairchild, "General-Purpose Gamut-Mapping Algorithms: Evaluation of Contrast-Preserving Rescaling Functions for Color Gamut Mapping", *Proc. IS&T/SID's 7th Color Imaging Conference*, pp. 167-172, 1999) use image content to select a compression function that is applied globally to the image. The same trade-offs still remain, though perhaps to a lesser extent.

When reducing the luminance range of an image to suit that of an output device, there is an inherent trade-off between overall image contrast, and detail in the shadows and/or highlights. A compression function that preserves or enhances contrast will generally sacrifice shadow and highlight detail, and vice versa. The preferred reproduction is a complex trade-off between these two aspects, and one that depends on image content.

Consider for example the function shown in FIG. 1, denoted Lcomp 1. This function can be described as follows. We first define a function $f(L_{in})$:

$$f(L_{in}) = L_{max} * (1 - (L_{in}/L_{max})^\gamma) \quad (1)$$

where $\gamma > 1$ is a selectable parameter. Function f( ), shown as the partially dashed and partially curved line in FIG. 1, is the inverse-gamma-inverse (IGI) function, and has been used successfully in previous work for luminance compression. Assuming that the reproducible lightness range of the output device is from $L_{black}$ to $L_{max}$, a hard-clipping function is then applied:

$$Lcomp1(L_{in}) = f(L_{in}) \quad \text{if } f(L_{in}) \geq L_{black} \quad (2)$$
$$= L_{black} \quad \text{if } f(L_{in}) < L_{black}$$

Lcomp 1 is shown as the dark solid line in FIG. 1. For reference, the identity function is shown as a dashed straight line. Note that the overall effect of Lcomp1 is to compress the range [0-$L_{max}$] to the range [$L_{black}$-$L_{max}$]. Also, Lcomp1 will generally preserve or enhance the image contrast. However, all L* variations in the range from 0-$L_{black}$ in the input image will be destroyed, since these are all mapped to the same output, $L_{black}$. Thus shadow detail is likely to be diminished or destroyed with Lcomp1.

The function Lcomp2 shown in FIG. 2 is the same as Lcomp1, except for a modification at the dark end to smoothly approach the device black point. This function thus softly compresses the low luminance region, and preserves shadow detail in the lightness range 0-$L_{black}$. However, this is accomplished at the expense of contrast in the dark and mid-tone regions. The two functions Lcomp1 and Lcomp2 exemplify the classic trade-off between preservation of contrast and shadow detail.

N. Moroney, "Local Color Correction Using Non-Linear Masking", *Proc. IS&T/SID's 8th Color Imaging Conference*, pp. 108-111, 2000, proposed a method in which the output of a low-pass filter is used to drive a variable gamma function applied to the input pixels. Shadow pixels are processed with a gamma close to 0.5 (thus lightening these areas), while highlight pixels are processed with a gamma close to 2 (thus darkening these areas). Midtones and areas of high local contrast are passed through with little alteration. Moroney's method applies a transformation that depends only on image characteristics, and not on any particular output device gamut. Also, a variable gamma approach can still significantly alter the image—a characteristic that is potentially dangerous.

U.S. Pat. No. 6,646,762 to T. Balasubramanian, et al. for "Gamut Mapping Preserving Local Luminance Differences" describes a system and method in which spatially varying gamut mapping techniques can significantly reduce the trade-offs and compromises found in pixel wise techniques. What is needed is a luminance compression algorithm for gamut mapping that varies across different parts of the image, spatially adapting the luminance compression function according to the local image characteristics in such a manner as to preserve both shadow detail and overall image contrast.

SUMMARY OF THE INVENTION

A system and method for gamut mapping includes a luminance compression algorithm for gamut mapping that varies across different parts of the image. In shadow regions, a soft compression function is applied to bring out the detail. In other regions, including areas with high local contrast, a hard clipping function is applied to preserve local contrast. The algorithm adaptively blends between these two functions to ensure that the overall compression function is spatially smooth. The system and method may also use chrominance information to compute "perceived lightness", to be used as input to the low-pass filter. Also, the blending function α( ) could be a function of chrominance as well as luminance.

A gamut mapping system, according to one aspect of the invention, includes an image processing module for transforming an input image into a luminance component $L_{in}$ and chrominance components, $C_1$ and $C_2$; a spatial low pass filter, responsive to $L_{in}$ for outputting a filtered luminance component $L_f$; and a luminance compression module responsive to $L_f$ and $L_{in}$ for outputting a compressed luminance signal $L_{out}$ that is within the achievable luminance range of an output device. In one embodiment of the invention, the luminance compression module combines two compression functions $L_{comp1}(L_{in})$ and $L_{comp2}(L_{in})$ via a blending function $\alpha(L_f)$. For example, $L_{out}$ may be computed according to the relationship $L_{out}=\alpha(L_f)\text{Lcomp1}(L_{in})+(1-\alpha(L_f))\text{Lcomp2}(L_{in})$.

The function $L_{comp1}$ may be optimized for preserving overall image contrast and the function $L_{comp2}$ may be optimized for preserving shadow detail. Various blending functions may be used. For example, $\alpha(L_f)$ may be a piecewise linear function, determined by two breakpoints, $B_1$ and $B_2$. One particular example of a blending function has the values: $\alpha(L_f)=0$ for values of $L_f$ between 0 and $B_1$; $\alpha(L_f)$ increases linearly from 0 to 1 for values of $L_f$ from $B_1$ to $B_2$; and $\alpha(L_f)=1$ for values of $L_f$ between $B_2$ and $L_{max}$, where $L_{max}$ is a maximum luminance achievable by the output device.

The system and method may also use chrominance information to compute "perceived lightness", to be used as input to the low-pass filter. In accordance with another embodiment of the invention, the luminance compression module, responsive to the chrominance components $C_1$ and $C_2$, in addition to $L_f$ and $L_{in}$, outputs a compressed luminance signal $L_{out}$ that is within the achievable luminance range of an output device. Also, the blending function α( ) may be a function of chrominance as well as luminance. In accordance with another embodiment of the invention, the system may further include a low pass filter, responsive to $C_1$ and $C_2$ for distinguishing shadow regions in the image and for outputting a filtered chrominance component $C_{1f}$ and $C_{2f}$; and wherein the blending function is a function of luminance and chrominance $\alpha(L_f, C_{1f}, C_{2f})$.

Various low pass filters may be used, for example, a constant weight filter. Additionally, the image may be down-sampled prior to filtering and upsampled and interpolated after filtering. A color correction module for transforming $L_{out}$, $C_1$ and $C_2$ to CMYK for printing may also be included.

DETAILED DESCRIPTION OF THE EMBODIMENTS

For purposes of the following discussion, the input image is assumed to be in a luminance-chrominance color space such as CIELAB or $YC_bC_r$ (if not, it is easily transformed into such a representation). Here the term "luminance" is being used generically to encompass the strict calorimetric definition of luminance (i.e., the Y component in XYZ), as well as lightness (e.g., the L* component in CIELAB). Similarly, chrominance is used generically to describe the two opponent color dimensions, red-green and blue-yellow.

Figure 1:
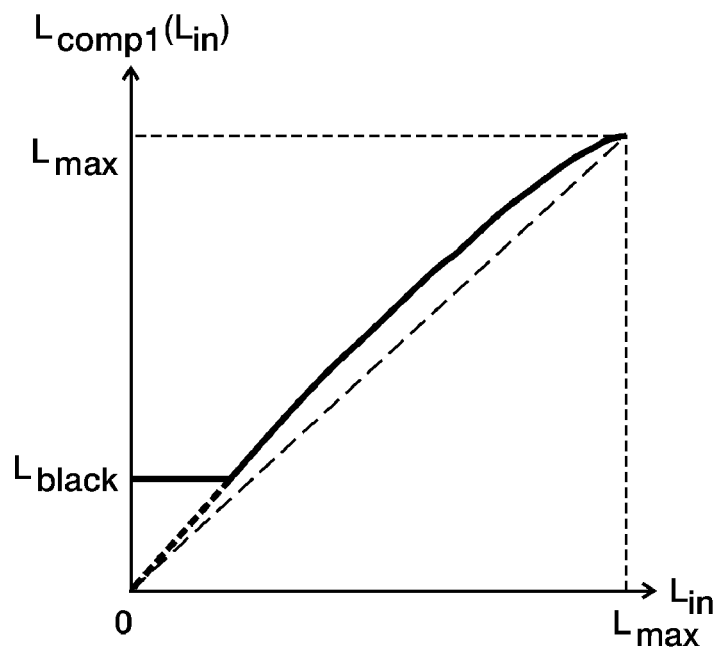
FIG. 1 is a graph of a luminance compression function, Lcomp1 (the IGI function combined with hard-clipping)
Figure 2:
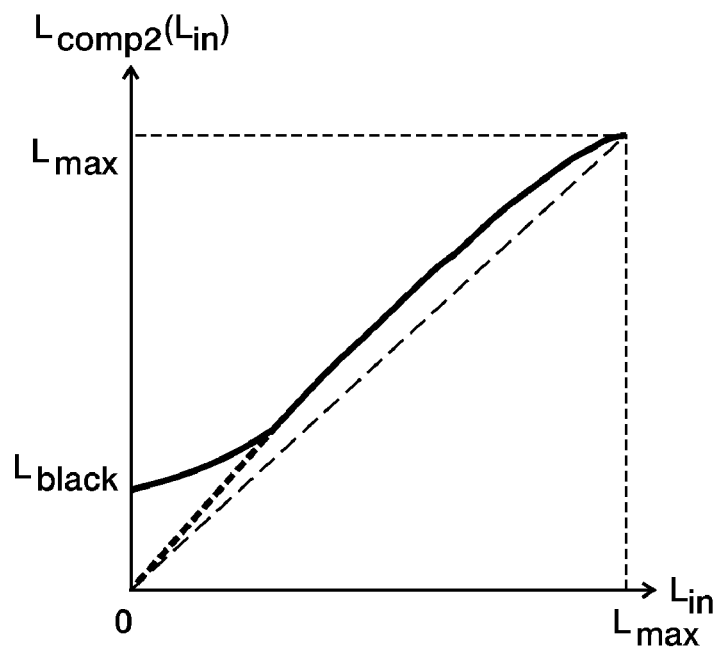
FIG. 2 is a graph of a luminance compression function, Lcomp2 (the IGI function adjusted at the black point)
Figure 3:
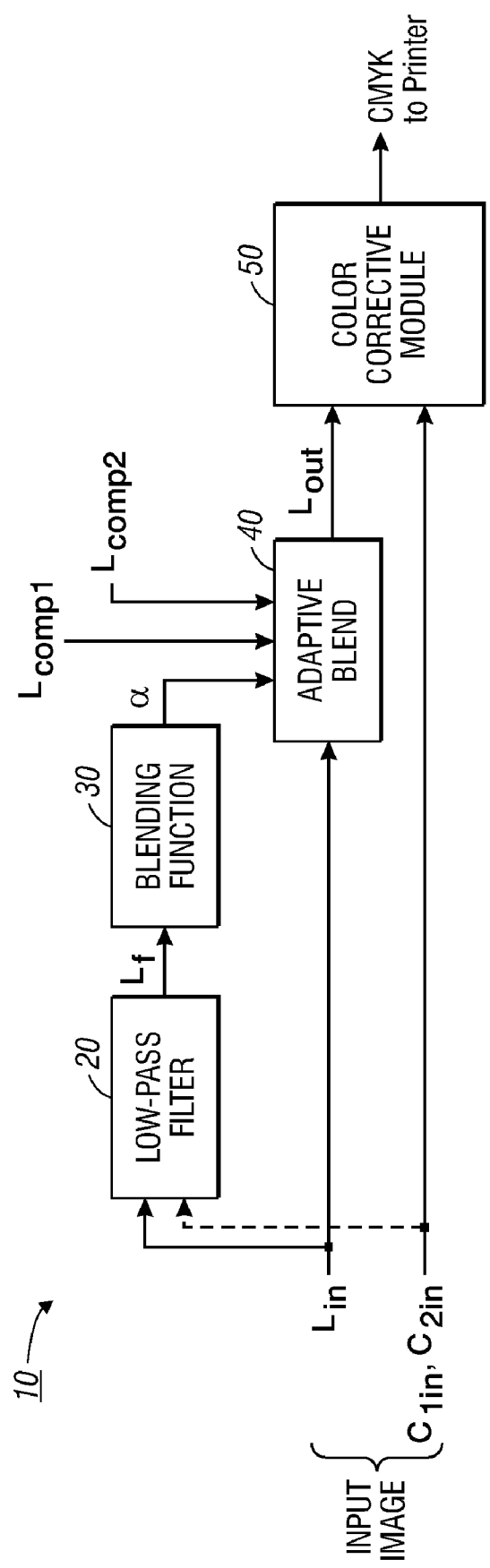
FIG. 3 is a block diagram of system for gamut mapping.

FIG. 3 is a block diagram of a system for spatially varying luminance compression for gamut mapping according to one aspect of the invention. An input image in CIELAB space includes three components: luminance component $L_{in}$, chrominance component $C_{1in}$ and chrominance component $C_{2in}$. The input luminance component $L_{in}$ is processed through a low-pass filter 20. This filter serves to distinguish large shadow areas from the rest of the image. It has to be small enough that shadow regions are passed through as low luminance, and large enough to filter out the detail in high-contrast regions. The output of low pass filter 20 is filtered image $L_f$, which is applied to blending function $\alpha(L_f)$ 30.

Figure 4:
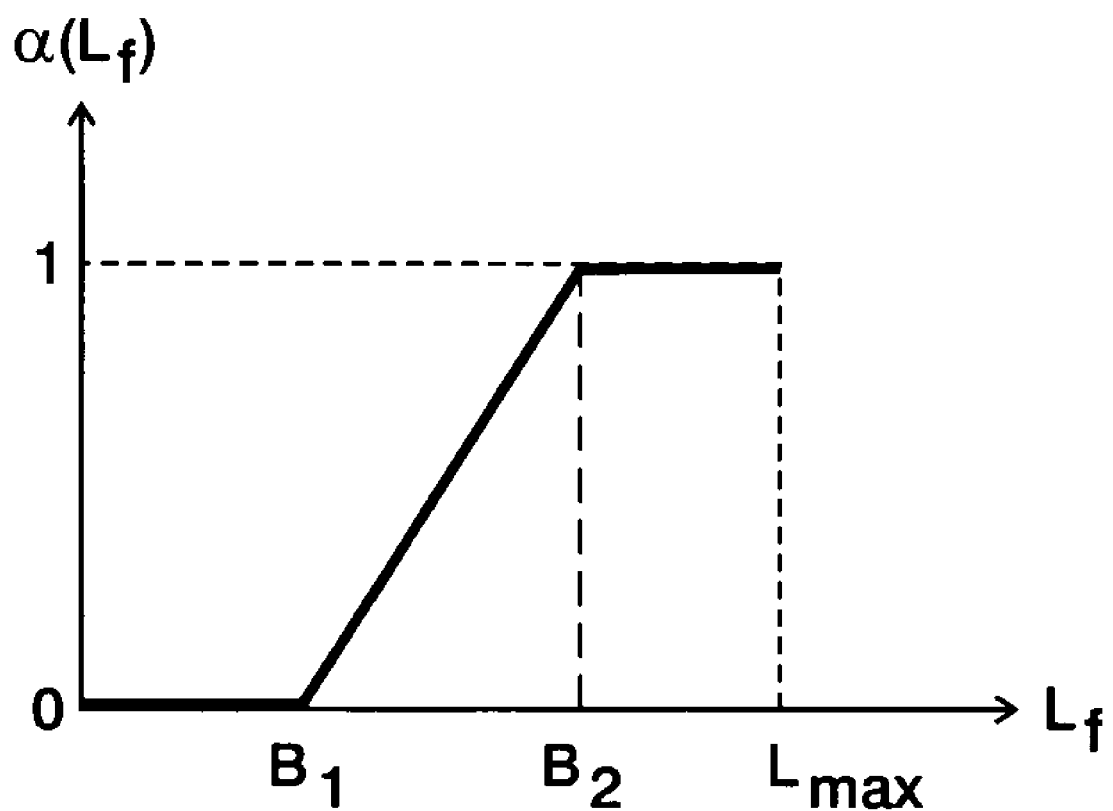
FIG. 4 is a graph of an exemplary blending function.

Many different spatially varying blending functions may be used. A simple example of a blending function $\alpha(L_f)$ is shown in FIG. 4. Referring to FIG. 4, $\alpha(L_f)$ is a piecewise linear function, determined by two breakpoints, $B_1$ and $B_2$. $\alpha(L_f)$ is: 0 for values of $L_f$ between 0 and $B_1$; increases linearly from 0 to 1 for values of $L_f$ from $B_1$ to $B_2$; and 1 for values of $L_f$ between $B_2$ and $L_{max}$.

The output of the blending function is then used to blend the two compression functions Lcomp1 and Lcomp2 in adaptive blending module 40 in as follows:

$$L_{out}=\alpha(L_f)\text{Lcomp1}(L_{in})+(1-\alpha(L_f))\text{Lcomp2}(L_{in}) \quad (3)$$

Note that the blending function $\alpha(L_f)$, and hence the final luminance compression varies as a function of spatial coordinates. Module 50 provides the color correction transform (including 3-D gamut clipping and conversion to CMYK). $L_{out}$ and the $C_{1in}$ and chrominance component $C_{2in}$ are input to module 50 to produce the printer specific color out.

Referring to equation (3), note that in shadow regions, $L_f$ is small, α is close to zero, and the soft compression function Lcomp2 predominates. In all other regions (i.e., mid-tones, highlights, and regions of high local contrast), $L_f$ increases as does $\alpha(L_f)$, and the clipping function Lcomp1 begins to predominate. Thus the luminance compression is adapted to suit the local spatial characteristics of the image.

The compression functions Lcomp1 and Lcomp2, the filter function (module 20) and blending function (module 30) can be co-optimized to achieve the desired emphasis on clipping vs. soft compression. Hence the system and method of the invention effectively provides a "knob" with different degrees of emphasis on contrast vs. shadow detail.

There are several ways to increase the efficiency of the low pass filtering operation of module 20. For example, a constant weight filter can be implemented as a running average, keeping track of only one row or column of the pixels covered by the filter. Furthermore, the image can be down-sampled prior to filtering (thus significantly reducing the filter size) and upsampled and interpolated after filtering.

The system illustrated in FIG. 3 may be modified to take advantage of chrominance information in addition to luminance (as suggested by the dashed lines in FIG. 3). The Helmholtz-Kohlrausch effect predicts that the perceived lightness of a stimulus increases with chroma. Thus it might be desirable to use the chrominance information to compute "perceived lightness", to be used as input to the low-pass filter. Referring to FIG. 3, chrominance components $C_1$ and $C_2$ may be provided to low pass filter module 20 (or to a separate low pass filter module) for distinguishing shadow regions in the image and for outputting a perceived luminance component $L_c$. In this case, $L_f$ and $L_c$ would be applied to blending function 30 and $L_{out}$ is a function of $L_f$ and $L_c$.

In accordance with another embodiment of the system and method of the invention, $C_1$ and $C_2$ are applied to low pass filter module 20 for distinguishing shadow regions in the image and for outputting a filtered chrominance component $C_{1f}$ and $C_{2f}$. In this case, the blending function $\alpha(\ )$ is a function of chrominance as well as luminance, i.e., $\alpha(L_f, C_{1f}, C_{2f})$. This blending function may be substituted in equation (3) for calculating $L_{out}$.

In accordance with another embodiment of the system and method of the invention, the functions being blended can provide 3-D gamut mapping, rather than 1-D luminance mapping.

The system and method of the invention applies a function that depends on both image characteristics and the output gamut. If a high quality image is to be rendered to a high-quality printer with a large dynamic range, the invention will not alter the image significantly (since the compression function in Equation 1 will approach an identity function). The system and method of the invention can be used in any printer or print driver that allows processing of multiple scan lines of an image.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A luminance dynamic range system comprising:
    an image processing module for transforming an input image into a luminance component $L_{in}$ and chrominance components, $C_1$ and $C_2$;
    a spatial low pass filter, responsive to $L_{in}$ for outputting a filtered luminance component $L_f$, wherein $L_f$ is a function only of $L_{in}$, wherein the low pass filter allows shadow regions to pass through as low luminance, and filters out detail in high-contrast regions; and
    a luminance compression module which performs gamut mapping that varies across different parts of the input image by spatially adapting a luminance compression function according to local image characteristics in such a manner as to preserve both shadow detail and overall image contrast, and is responsive to $L_f$ and $L_{in}$ for performing luminance compression on the luminance component $L_{in}$ to output a compressed luminance signal which is represented as an overall compression function $L_{out}$ that is within an achievable luminance range of an output device; wherein the luminance compression module combines two compression functions $L_{comp1}(L_{in})$ and $L_{comp2}(L_{in})$ via a blending function $\alpha(L_f)$, thereby, producing the overall compression function $L_{out}$; wherein the function $L_{comp1}$ is optimized for preserving the overall image contrast and the function $L_{comp2}$ is optimized for preserving the shadow detail; wherein the functions $L_{comp1}(L_{in})$ and $L_{comp2}(L_{in})$ are functions only of $L_{in}$, and the functions $\alpha(L_f)$ is only a function of $L_f$; and wherein the functions $L_{comp1}(L_{in})$ are both designed such that the overall compression function $L_{out}$ is spatially smooth and maps a luminance dynamic range of the input image to a more limited luminance dynamic range of the output device.

2. The system of claim 1, wherein the overall compression function $L_{out}$ is computed according to the relationship $L_{out} = \alpha(L_f) L_{comp1}(L_{in}) + (1-\alpha(L_f)) L_{comp2}(L_{in})$.

3. The system of claim 1, wherein the function $\alpha(L_f)$ is a piecewise linear function, determined by two breakpoints, $B_1$ and $B_2$.

4. The system of claim 3, wherein:
    the function $\alpha(L_f)$ is equal to 0 for values of $L_f$ between 0 and $B_1$;
    the function $\alpha(L_f)$ increases linearly from 0 to 1 for values of $L_f$ from $B_1$ to $B_2$; and
    the function $\alpha(L_f)$ is equal to 1 for values of $L_f$ between $B_2$ and $L_{max}$,
    where $L_{max}$ is a maximum luminance achievable by the output device.

5. The system of claim 1, wherein the low pass filter comprises a constant weight filter.

6. The system of claim 1, wherein the input image is downsampled prior to filtering and upsampled and interpolated after filtering.

7. The system of claim 1, further comprising a color correction module for transforming $L_{out}$, $C_1$ and $C_2$ to CMYK for printing.

8. A method for luminance dynamic range mapping, comprising:
    transforming an input image into a luminance component $L_{in}$ and chrominance components, $C_1$ and $C_2$;
    spatially low pass filtering $L_{in}$ into a filtered luminance component $L_f$, wherein $L_f$ is a function only of $L_{in}$ wherein the low pass filtering passes shadow regions through as low luminance, and filters out detail in high-contrast regions; and
    processing $L_f$ and $L_{in}$ through a luminance compression module which performs gamut mapping that varies across different parts of the input image by spatially adapting a luminance compression function according to local image characteristics in such a manner as to preserve both shadow detail and overall image contrast in order to obtain a compressed luminance signal which is represented as an overall compression function $L_{out}$ that is within an achievable luminance range of an output device; wherein the processing step comprises combining two compression functions $L_{comp1}(L_{in})$ and $L_{comp2}(L_{in})$ via a blending function $\alpha(L_f)$, thereby, producing the overall compression function $L_{out}$; wherein the function $L_{comp1}$ is optimized for preserving the overall image contrast and the function $L_{comp2}$ is optimized for preserving the shadow detail; wherein the functions $L_{comp1}(L_{in})$ and $L_{comp2}(L_{in})$ are functions only of $L_{in}$, and the function $\alpha(L_f)$ is only a function of $L_f$; and wherein functions $L_{comp1}(L_{in})$ and $L_{comp2}(L_{in})$ are both designed such that the overall compression function $L_{out}$ is spatially smooth and to maps a luminance dynamic range of the input image to a more limited luminance dynamic range of the output device, wherein the above steps are performed by a processor.

9. The method of claim 8, wherein the functions $L_{comp1}(L_{in})$ and $L_{comp2}(L_{in})$ are combined according to the relationship $L_{out} = \alpha(L_f) L_{comp1}(L_{in}) + (1-\alpha(L_f)) L_{comp2}(L_{in})$.

10. The method of claim 8, wherein the function $\alpha(L_f)$ is a piecewise linear function, determined by two breakpoints, $B_1$ and $B_2$.

11. The method of claim 10, wherein:
    the function $\alpha(L_f)$ is equal to 0 for values of $L_f$ between 0 and $B_1$;

the function $\alpha(L_f)$ increases linearly from 0 to 1 for values of $L_f$ from $B_1$ to $B_2$; and function $\alpha(L_f)$ is equal to 1 for values of $L_f$ between $B_2$ and $L_{max}$;

where $L_{max}$ is a maximum luminance achievable by the output device.

12. The method of claim 8, wherein the spatial low pass filtering comprises applying a constant weight filter.

13. The method of claim 8, further comprising down-sampling the input image prior to filtering and upsampling and interpolating the input image after filtering.

14. The method of claim 8, further comprising applying a color correction for transforming $L_{out}$, $C_1$ and $C_2$ to CMYK for printing.

* * * * *